United States Patent
Wu

(10) Patent No.: US 8,780,315 B2
(45) Date of Patent: Jul. 15, 2014

(54) LCD PANEL, COLOR FILTER SUBSTRATE, AND METHOD OF MANUFACTURING THE COLOR FILTER SUBSTRATE

(75) Inventor: Chun-Ming Wu, Guandong (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 140 days.

(21) Appl. No.: 13/642,975

(22) PCT Filed: Jun. 11, 2012

(86) PCT No.: PCT/CN2012/076699
§ 371 (c)(1),
(2), (4) Date: Oct. 23, 2012

(87) PCT Pub. No.: WO2013/177823
PCT Pub. Date: Dec. 5, 2013

(65) Prior Publication Data
US 2013/0321750 A1 Dec. 5, 2013

(30) Foreign Application Priority Data
May 31, 2012 (CN) .......................... 2012 1 0176512

(51) Int. Cl.
G02F 1/1333 (2006.01)
G02F 1/1335 (2006.01)
G02F 1/1343 (2006.01)

(52) U.S. Cl.
USPC .............................. 349/158; 349/106; 349/139

(58) Field of Classification Search
CPC ............ G02F 1/1333; G02F 1/133308; G02F 1/133707; G02F 1/133351; G02F 1/133514; G02F 1/133516; G02F 1/133512; G02F 1/134309; G02F 1/134336; G02F 2001/133388
USPC .......................................... 349/158, 106, 139
See application file for complete search history.

(56) References Cited

U.S. PATENT DOCUMENTS

| | | | | |
|---|---|---|---|---|
| 5,876,884 | A * | 3/1999 | Maeda et al. | 430/22 |
| 6,256,080 | B1 * | 7/2001 | Colgan et al. | 349/129 |
| 7,532,277 | B2 * | 5/2009 | Kwon et al. | 349/110 |
| 2002/0145688 | A1 * | 10/2002 | Sekiguchi | 349/114 |
| 2007/0109487 | A1 * | 5/2007 | Lee et al. | 349/187 |
| 2008/0067595 | A1 * | 3/2008 | Kawase | 257/350 |
| 2012/0008078 | A1 * | 1/2012 | Kim | 349/123 |

* cited by examiner

Primary Examiner — Mike Qi
(74) Attorney, Agent, or Firm — Andrew C. Cheng

(57) ABSTRACT

A liquid crystal display (LCD) panel, a color filter (CF) substrate, and a method of manufacturing the CF substrate are proposed. The method includes forming a black matrix pattern on an invalid pixel domain on a transparent substrate for forming an alignment mark, coating a transparent conducting layer on the invalid pixel domain for covering the alignment mark, and patterning the transparent conducting layer so that the alignment mark and the peripheral domain of the alignment mark could have a different feature of coverage. The alignment mark and the peripheral domain of the alignment mark show optics differences obviously through a CCD (charge-coupled device) optical reading lens, which increases the success ratio of reading the alignment mark and improves manufacturing efficiency.

17 Claims, 5 Drawing Sheets

LCD PANEL, COLOR FILTER SUBSTRATE, AND METHOD OF MANUFACTURING THE COLOR FILTER SUBSTRATE

BACKGROUND OF THE INVENTION

1. Field of the Invention

The present invention relates to the field of liquid crystal displays (LCDs), and more particularly, to a color filter (CF) substrate and a method of manufacturing the same. Further, the present invention relates to an LCD panel comprising the CF substrate.

2. Description of the Prior Art

An alignment mark plays an important role in the process of manufacturing an LCD panel. The way of ascertaining locations and calculating coordinates is to read the location of the alignment mark. For example, the location of the alignment mark has to be read when coordinates are located with sophisticated measurement equipment. The location of the alignment mark also has to be read when the alignment mark is exposed with an exposure machine. For assembling the LCD panel, it is necessary to use the alignment mark to ascertain an location of an active array substrate and a CF substrate.

Please refer to FIG. 1 illustrating a schematic, diagram of an lignment mark 1010 on the CF substrate in the conventional technology.

As shown in FIG. 1, a plurality of valid pixel domains 100 and an invalid pixel domain 101 surrounding the plurality of valid pixel domains 100 are disposed on a transparent substrate 10 of the CF substrate in the conventional technology. A black matrix pattern is formed on the invalid pixel domain 101 and used as the alignment mark 1010. The alignment mark 1010 could be a square or a cross in shape.

Please refer to FIG. 2 showing a partial cross-sectional view of the invalid pixel domain 101 as shown in FIG. 1. A transparent conducting layer 120 is disposed on the invalid pixel domain 101 disposed on the transparent substrate 10. The transparent conducting layer 120 is also disposed on the alignment mark 1010 and the peripheral domain of the alignment mark 1010 completely. That is to say, the alignment mark 1010 and the peripheral domain of the alignment mark 1010 covered by the transparent conducting layer 120 have the same feature of coverage.

The alignment mark 1010 could not be read by a CCD (charge-coupled device) optical reading lens because the alignment mark 1010 and the peripheral domain of the alignment mark 1010 have the same feature of coverage, that is, no optical differences. Accordingly, the success ratio of reading the alignment mark 1010 is low or even zero, resulting in a faulty location accuracy, a low equipment utilization rate, low manufacturing efficiency, and low production capacity.

SUMMARY OF THE INVENTION

An object of the present invention is to provide an LCD panel, a CF substrate thereof, and a method of manufacturing the CF substrate for increasing the possibility of optical CCD lens' reading an alignment mark.

According to the present invention, a method of manufacturing a color filter (CF) substrate, comprises: forming a black matrix on an invalid pixel domain on a transparent substrate for forming an alignment mark; coating a transparent conducting layer on the invalid pixel domain for covering the alignment mark; patterning the transparent conducting layer so that the alignment mark and a peripheral domain of the alignment mark have a different feature of coverage.

In one aspect of the present invention, patterning the transparent conducting layer for exposing the alignment mark is performed, and the transparent conducting layer covering the peripheral domain of the alignment mark remains intact.

In another aspect of the present invention, patterning the transparent conducting layer for exposing the invalid pixel domain on the peripheral domain of the alignment mark is performed, and the transparent conducting layer covering the alignment mark remains intact.

In another aspect of the present invention, patterning the transparent conducting layer for exposing the invalid pixel domain on the peripheral domain close to the alignment mark is performed, and the alignment mark and the transparent conducting layer covering the peripheral domain far away from the alignment mark remain intact.

In still another aspect of the present invention, patterning the transparent conducting layer for exposing part of the alignment mark is performed, and the other part of the alignment mark and the transparent conducting layer covering the peripheral domain of the alignment mark remain intact.

According to the present invention, a color filter substrate comprises: as transparent substrate, comprising an invalid pixel domain; as black matrix pattern, formed on the invalid pixel domain for forming an alignment mark; and a transparent conducting layer, disposed on the invalid pixel domain, and the alignment mark and a peripheral domain of the alignment mark covered by the transparent conducting layer having a different feature of coverage.

In one aspect of the present invention, the transparent conducting layer does not cover the alignment mark and covers the peripheral domain of the alignment mark.

In another aspect of the present invention, the transparent conducting layer covers part of the alignment mark and the peripheral domain of the alignment mark.

In another aspect of the present invention, the transparent conducting layer covers the alignment mark and does not cover the peripheral domain of the alignment mark.

In another aspect of the present invention, the transparent conducting layer covers the alignment mark and does not cover the peripheral domain of the alignment mark except the alignment mark on the invalid pixel domain.

In still another aspect of the present invention, the transparent conducting layer covers the alignment mark and the peripheral domain far away the alignment mark, and does not cover the peripheral domain close to the alignment mark.

According to the present invention, a liquid crystal display (LCD) panel comprises: an active array substrate and a CF substrate which are disposed oppositely to each other; a liquid crystal (LC) layer, sandwiched between the active array substrate and the CF substrate. The CF substrate comprises: a transparent substrate, comprising an invalid pixel domain; a black matrix pattern, formed on the invalid pixel domain for forming an alignment mark; a transparent conducting layer, disposed on the invalid pixel domain, and the alignment mark and a peripheral domain of the alignment mark covered by the transparent conducting layer having a different feature of coverage.

In one aspect of the present invention, the transparent conducting layer does not cover the alignment mark and covers the peripheral domain of the alignment mark.

In another aspect of the present invention, the transparent conducting layer covers part of the alignment mark and the peripheral domain of the alignment mark.

In still another aspect of the present invention, the transparent conducting layer covers the alignment mark and does not cover the peripheral domain of the alignment mark.

In still another aspect of the present invention, the transparent conducting layer covers the alignment mark and does not cover the peripheral domain of the alignment mark except the alignment mark on the invalid pixel domain.

In still another aspect of the present invention, the transparent conducting layer covers the alignment mark and the peripheral domain far away the alignment mark, and does not cover the peripheral domain close to the alignment mark.

Differing from prior art, the transparent conducting layer is patterned so that the alignment mark and the peripheral domain of the alignment mark have a different feature of coverage of the transparent conducting layer in the present invention. The difference between the alignment mark and the peripheral domain of the alignment mark become more obvious through the CCD optical reading lens. As a result, the success ratio of optical CCD lens' reading the alignment mark is increased. Further, the location accuracy of the process, the equipment utilization rate of the process, the manufacturing efficiency, and the production capacity are improved.

DETAILED DESCRIPTION OF THE PREFERRED EMBODIMENTS

These and other features, aspects and advantages of the present disclosure will become understood with reference to the following description, appended claims and accompanying figures.

Figure 1:
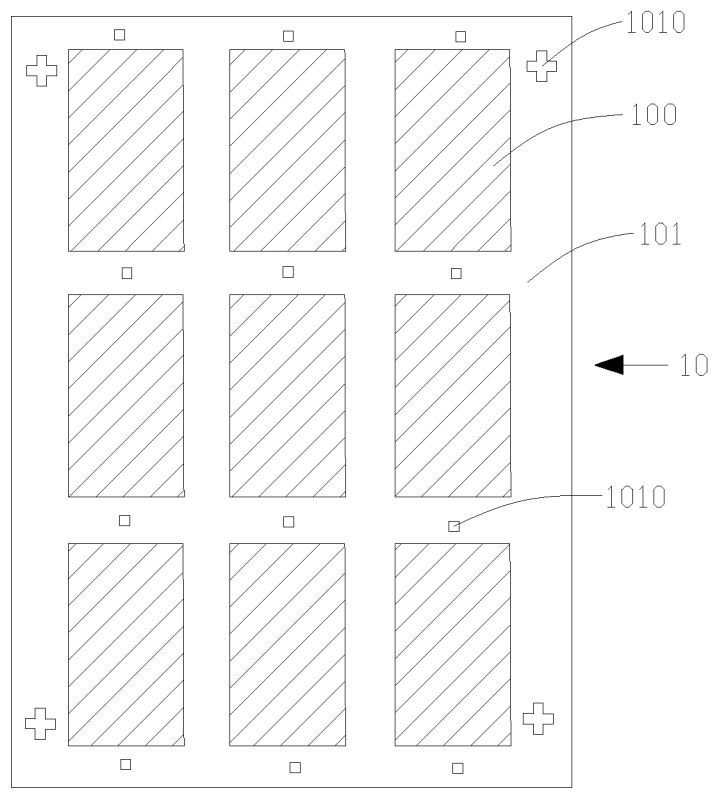
FIG. 1 illustrates a schematic diagram of an lignment mark on the CF substrate in the conventional technology.
Figure 2:
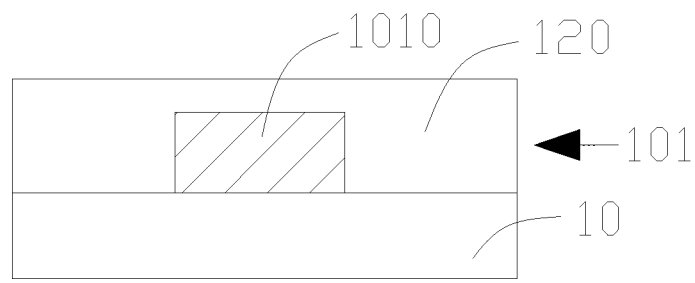
FIG. 2 shows a partial cross-sectional view of the invalid pixel domain as shown in FIG. 1.
Figure 3:
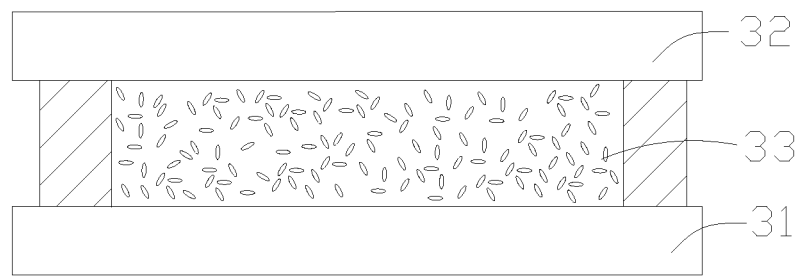
FIG. 3 shows a schematic diagram of an LCD panel comprising a color filter substrate according to the present invention.

Please refer to FIG. 3 showing a schematic diagram of an LCD panel comprising a color filter substrate according to the present invention. The LCD panel, comprises an active array substrate 31, a color filter substrate 32, and a liquid crystal (LC) layer 33 sandwiched between the active array substrate 31 and the color filter substrate 32 in the present embodiment.

The active array substrate 31 and the color filter substrate 32 are disposed oppositely to each other. The active array substrate 31 comprises a transparent substrate, a driving wiring disposed on the transparent substrate, and an alignment layer disposed on the transparent substrate. The active array substrate 31 used in the present invention is the same as that used in the conventional technology. So the detailed description of the structure of the active array substrate 31 will not herein be repeated.

The color filter substrate 32 is referred to as the CF substrate. Colorful images are shown on the LCD panel through the CF substrate 32.

Figure 4:
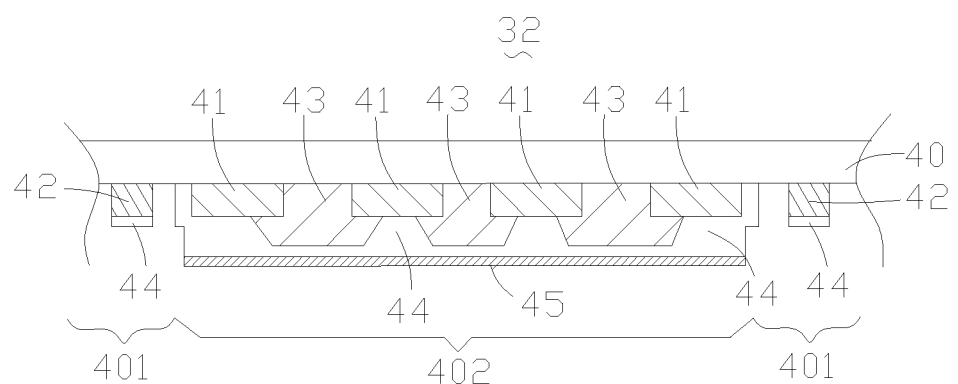
FIG. 4 shows a schematic diagram of the CF substrate according to a first embodiment of the present invention.

Please refer to FIG. 4 showing a schematic diagram of the CF substrate 32 according to the first embodiment of the present invention.

The CF substrate 32 comprises the transparent substrate 40, a first black matrix pattern 41, a second black matrix pattern 42, a color photoresist layer 43, a transparent conducting layer 44, and the alignment layer 45. The first black matrix pattern 41, the second black matrix pattern 42, the color photoresist layer 43, the transparent conducting layer 44, and the alignment layer 45 all are disposed on the transparent substrate 40.

The transparent substrate 40 comprises an invalid pixel domain 401 and a valid pixel domain 402. The second black matrix pattern 42 is formed on the invalid pixel domain 401 and used as an alignment mark. A plurality of first black matrix patterns 41 at intervals are disposed on the valid pixel domain 402. The color photoresist layer 43 is disposed between two adjacent first black matrix patterns 41. The transparent conducting layer 44 is disposed on the valid pixel domain 402 and the invalid pixel domain 401. The alignment layer 45 is disposed on the transparent conducting layer 44, and preferably on the valid pixel domain 402.

The transparent conducting layer 44 covers the alignment mark 42 (i.e., the second black matrix pattern 42) while does not cover the peripheral domain of the alignment mark 42 in the present embodiment. As a result, the alignment mark 42 and the peripheral domain of the alignment mark 42 on the invalid pixel domain 401 have a different feature of coverage. The domain covered by the transparent conducting layer 44 is different from the domain without being covered by the transparent conducting layer 44. Specifically, the alignment mark 42 belongs to the domain covered by the transparent conducting layer 44. The peripheral domain of the alignment mark 42 on the invalid pixel domain 401 belongs to the domain which is not covered by the transparent conducting layer 44. That is, the domain excluding die alignment mark 42 is not covered by the transparent conducting layer 44.

The domain covered by the transparent conducting layer 44 and the domain without being covered by the transparent conducting layer 44 show differences in optical contrast through the CCD optical reading lens. The alignment mark 42 could be rapidly read and oriented when being read by the CCD optical reading lens. Thus, the success ratio of COD optical reading lens' reading the alignment mark 42 is increased.

Compared with the conventional technology, it is unnecessary to recognize tiny alignment mark 42 in the invalid pixel domain 401, which is totally covered by the transparent conducting layer 44, in the present invention. It implies that reading time is shortened, the location accuracy and equipment utilization rate in the process, the manufacturing efficiency, and the production capacity all are improved.

Figure 5:
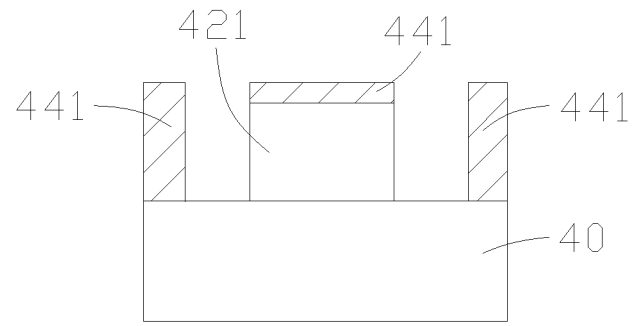
FIG. 5 shows a schematic diagram of an invalid pixel domain disposed on a CF substrate according to a second embodiment of the present invention.
Figure 6:
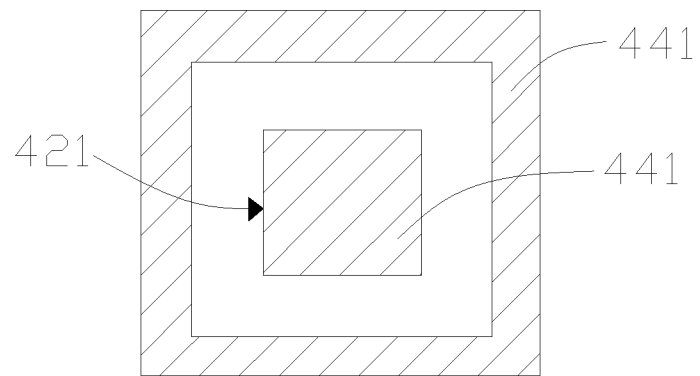
FIG. 6 is a top view of FIG. 5.

Please refer to FIG. 5 showing a schematic diagram of an invalid pixel domain disposed on a CF substrate according to a second embodiment of the present invention. FIG. 6 is a top view of FIG. 5.

Please refer to FIG. 5 and FIG. 6 showing the present embodiment. Differing from the first embodiment, the transparent conducting layer 441 does not cover the peripheral domain dose to an alignment mark 421 on the invalid pixel domain 401 while covers the alignment mark 421 and the domain far away from the alignment mark 421 on the invalid pixel domain 401 on the CF substrate in the present embodiment. The covering of the transparent conducting layer 441 determines the difference between the alignment mark 421 and the peripheral domain of the alignment mark 421, which effectively increases the success ratio of reading the alignment mark 421.

Figure 7:
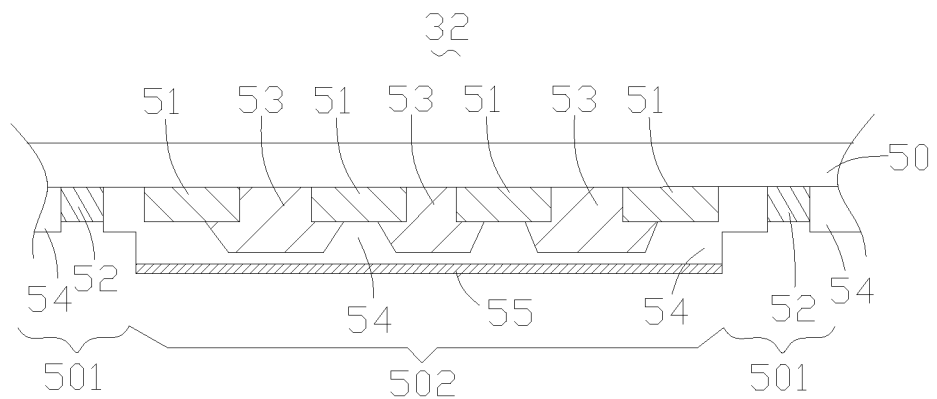
FIG. 7 shows a schematic diagram of a CF substrate according to a third embodiment of the present invention.

Please refer to FIG. 7 showing a schematic diagram of a CF substrate 32 according to a third embodiment of the present invention.

The CF substrate 32 comprises a transparent substrate 50, a first black matrix pattern 51, a second black matrix pattern 52, a color photoresist layer 53, a transparent conducting layer 54, and an alignment layer 55. The first black matrix pattern 51, the second black matrix pattern 52, the color photoresist layer 53, and the transparent conducting layer 54, and the alignment layer 55 all are disposed on the transparent substrate 50.

The transparent substrate 50 comprises an invalid pixel domain 501 and a valid pixel domain 502. The second black matrix pattern 52 is formed on the invalid pixel domain 501 and used as an alignment mark 52. A plurality of first black matrix patterns 51 at intervals are disposed on the valid pixel domain 502. The color photoresist layer 53 is disposed between two adjacent first black matrix patterns 51. The transparent conducting layer 54 is disposed on the valid pixel domain 502 and the invalid pixel domain 501. The alignment layer 55 is disposed on the transparent conducting layer 54, and preferably on the valid pixel domain 502.

The transparent conducting layer 54 does not cover the alignment mark 52 (i.e., the second. black matrix pattern 52) while covers the peripheral domain of the alignment mark 52 on the invalid pixel domain 501 in the present embodiment. As a result, the alignment mark 52 and the peripheral domain of the alignment mark 52 have a different feature of coverage. The domain covered by the transparent conducting layer 54 is different from the domain which is not covered by the transparent conducting layer 54.

The domain covered by the transparent conducting layer 54 and the domain which is not covered by the transparent conducting layer 54 show differences in optical contrast through the CCD optical reading lens. The alignment mark 52 could be rapidly read and oriented when being read by the CCD optical reading lens. Thus, the success ratio of CCD optical reading lens' reading the alignment mark 52 is increased.

Figure 8:
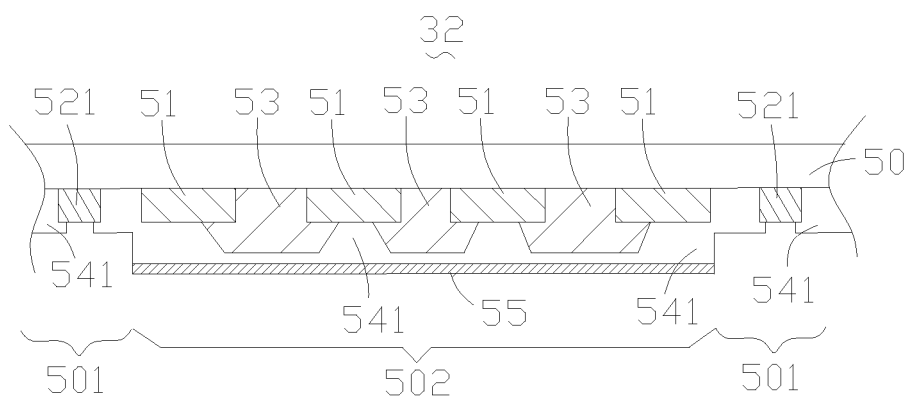
FIG. 8 is a schematic diagram of an invalid pixel domain on a CF substrate according to a fourth embodiment of the present invention.

It should be understood that it is allowed that part of the alignment mark 52 is covered by the transparent conducting layer 54 in the embodiment shown in FIG. 7. The premise is that the alignment mark 52, covered by the transparent conducting layer 54, and the peripheral domain of the alignment mark 52, which is not covered by the transparent conducting layer 54, have a different feature of coverage. Specifically, referring to FIG. 8, FIG. 8 is a schematic diagram of an invalid pixel domain 501 on a CF substrate 32 according to a fourth embodiment of the present invention.

Differing from the embodiment shown in FIG. 7, in the present embodiment the transparent conducting layer 541 covers part of the alignment mark 521 and the perioheral domain of the alignment mark 521, Preferably, the transparent conducting layer 541 covers no more than 50% of the total surface area of the alignment mark 521. Accordingly, the alignment mark 521 and the peripheral domain of the alignment mark 521 have an obviously different feature of coverage. The alignment mark 521 could be rapidly read while being read by the CCD optical reading lens. Thus, the success ratio of CCD optical reading lens' reading the alignment mark 521 is increased.

Figure 9:
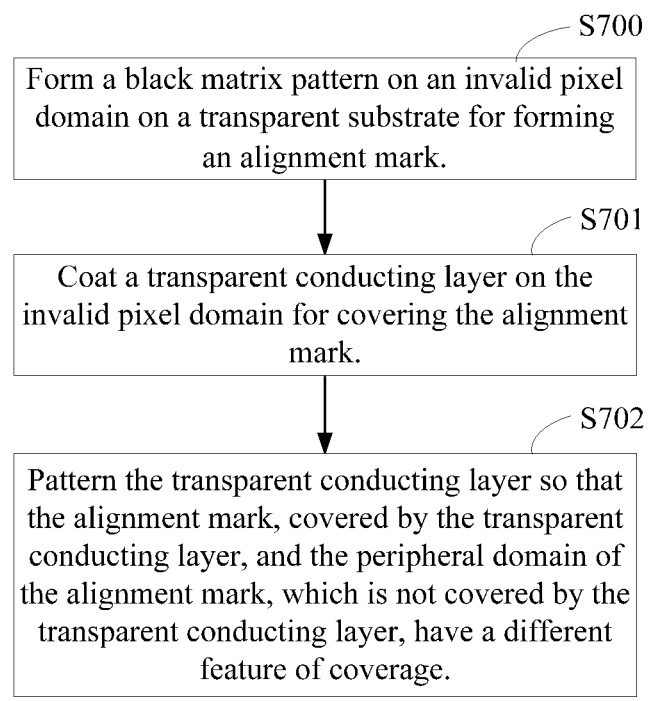
FIG. 9 shows a flowchart of a method of manufacturing a CF substrate according to an embodiment of the present invention.

Please refer to FIG. 9 showing a flowchart of a method of manufacturing a CF substrate according to an embodiment of the present invention.

In the present embodiment, the method of manufacturing the CF substrate comprises the following steps of:

Step S700: Form a black matrix pattern on an invalid pixel domain on a transparent substrate for forming an alignment mark.

Moreover, Step S700 could comprise disposing a plurality of black matrix patterns at intervals on a valid pixel domain on the transparent substrate and disposing a color photoresist layer between every two adjacent black matrix patterns on the valid pixel domain. Please refer to FIGS. 3 to 8 illustrating the structures of a first black matrix pattern, a second black matrix pattern, and the color photoresist layer. The detailed description of the structure of these components will not herein be repeated.

Step S701: Coat a transparent conducting layer on the invalid pixel domain for covering the alignment mark.

Step S701 could also comprise coating a transparent conducting layer on the valid pixel domain for covering the plurality of black matrix patterns and the plurality of color photoresist layers.

Step S702: Patterning the transparent conducting layer so that a feature of coverage of the alignment mark is different from that of the peripheral domain of the alignment mark.

In other embodiments, Step S702 could also pattern the transparent conducting layer on the valid pixel domain. The process of patterning the valid pixel domain or the invalid pixel domain comprises photoresist coating, exposure, development, etching, and photoresist stripping. There are three primary exposure methods: contact, proximity, and projection. There are still other exposure methods, so the exposure method is not defined in the present invention.

Specifically, a method of implementing Step S702 is:

Patterning the transparent conducting layer on the invalid pixel domain for exposing the invalid pixel domain on the peripheral domain of the alignment mark. The transparent conducting layer which covers the alignment mark remains intact. Further, only the invalid pixel domain on the peripheral domain close to the alignment mark is exposed after patterning the transparent conducting layer. The transparent conducting layer which covers the alignment marks and the peripheral domain far away than the alignment mark remains intact. As a result, the CF substrate as shown in FIGS. 4 to 6 is formed.

Another method of implementing Step S702 is:

Pattern the transparent conducting layer on the invalid pixel domain for exposing the alignment mark. The transparent conducting layer which covers the peripheral domain of the alignment mark remains intact. Further, patterning the transparent conducting layer for exposing part of the alignment mark. The transparent conducting laser which covers the other or the alignment mark and the peripheral domain of the alignment marks remains intact. As a result, the CF substrate as shown in FIGS. 7 to 8 is formed.

Step S702 is followed by other steps such as forming an alignment layer and forming a spacer layer. The steps of forming the alignment layer and forming the spacer layer on the CF substrate are similar to those adopted in the conventional technology, so the detailed description of these steps will not herein be repeated.

In sum, the transparent conducting layer is patterned in the present invention. The covering of the transparent conducting layer determines that the alignment mark and the peripheral domain of the alignment mark have a different feature of coverage. The difference between the alignment mark and the peripheral domain of the alignment mark become inure obvious through the CCD optical reading lens. As a result, the success ratio of CCD optical reading lens' reading the alignment mark 42 is increased. Moreover, the location accuracy and the equipment utilization rate in the process are improved, thereby increasing the manufacturing efficiency and the production capacity.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A method of manufacturing a color filter (CF) substrate, comprising:
    forming a black matrix pattern on an invalid pixel domain on a transparent substrate for forming an alignment mark;
    coating a transparent conducting layer on the invalid pixel domain for covering the alignment mark;
    patterning the transparent conducting layer so that the alignment mark and a peripheral domain of the alignment mark have a different feature of coverage.

2. The method as claimed in claim 1, wherein patterning the transparent conducting layer for exposing the alignment mark is performed, and the transparent conducting layer covering the peripheral domain of the alignment mark remains intact.

3. The method as claimed in claim 1, wherein patterning the transparent conducting layer for exposing the invalid pixel domain on the peripheral domain of the alignment mark is performed, and the transparent conducting layer covering the alignment mark remains intact.

4. The method as claimed in claim 1, wherein patterning the transparent conducting layer for exposing the invalid pixel domain on the peripheral domain close to the alignment mark is performed, and the alignment mark and the transparent conducting layer covering the peripheral domain far away from the alignment mark remain intact.

5. The method as claimed in claim 1, wherein patterning the transparent conducting layer for exposing part of the alignment mark is performed, and the other part of the alignment mark and the transparent conducting layer covering the peripheral domain of the alignment mark remain intact.

6. A color filter substrate comprising:
    a transparent substrate, comprising an invalid pixel domain:
    a black matrix pattern, formed on the invalid pixel domain for forming an alignment mark; and
    a transparent conducting layer, disposed on the invalid pixel domain, and the alignment mark and a peripheral domain of the alignment mark covered by the transparent conducting layer having a different feature of coverage.

7. The color filter substrate as claimed in claim 6, wherein the transparent conducting layer does not cover the alignment mark and covers the peripheral domain of the alignment mark.

8. The color filter substrate as claimed in claim 6, wherein the transparent conducting layer covers part of the alignment mark and the peripheral domain of the alignment mark.

9. The color filter substrate as claimed in claim 6, wherein the transparent conducting layer covers the alignment mark and does not cover the peripheral domain of the alignment mark.

10. The color filter substrate as claimed in claim 9, wherein the transparent conducting layer covers the alignment mark and does not cover the peripheral domain of the alignment mark except the alignment mark on the invalid pixel domain.

11. The color filter substrate as claimed in claim 9, Wherein the transparent conducting layer covers the alignment mark and the peripheral domain far away the alignment mark, and does not cover the peripheral domain close to the alignment mark.

12. A liquid crystal display (LCD) panel, comprising:
    an active array substrate and a CF substrate which are disposed oppositely to each other;
    a liquid crystal (LC) layer, sandwiched between the active array substrate and the CF substrate, wherein the CF substrate comprises:
    a transparent substrate, comprising an invalid pixel domain;
    a black matrix pattern, formed on the invalid pixel domain for forming an alignment mark;
    a transparent conducting layer, disposed on the invalid pixel domain, and the alignment mark and a peripheral domain of the alignment mark covered by the transparent conducting layer having a different feature of coverage.

13. The LCD panel as claimed in claim 12, wherein the transparent conducting layer does not cover the alignment mark and covers the peripheral domain of the alignment mark.

14. The LCD panel as claimed in claim 12, wherein the transparent conducting layer covers part or the alignment mark and the peripheral domain of the alignment mark.

15. The LCD panel as claimed in claim 12, wherein the transparent conducting layer covers the alignment mark and does not cover the peripheral domain of the alignment mark.

16. The LCD panel as claimed in claim 15, wherein the transparent conducting layer covers the alignment mark and does not cover the peripheral domain of the alignment mark except the alignment mark on the invalid pixel domain.

17. The LCD panel as claimed in claim 15, wherein the transparent conducting layer covers the alignment mark and the peripheral domain far away the alignment mark, and does not cover the peripheral domain close to the alignment mark.

* * * * *